US008126992B2

(12) United States Patent
Andreev et al.

(10) Patent No.: US 8,126,992 B2
(45) Date of Patent: Feb. 28, 2012

(54) METHOD AND SYSTEM FOR OPTIMALLY SCHEDULING A WEB CONFERENCE MANAGED BY A WEB APPLICATION

(75) Inventors: Dmitry Andreev, Port Chester, NY (US); Paul Gregory Greenstein, Croton-on-Hudson, NY (US); Galina Grunin, Briarcliff Manor, NY (US); Gregory Vilshansky, Chappaqua, NY (US)

(73) Assignee: International Business Machines Corporation, Armonk, NY (US)

( * ) Notice: Subject to any disclaimer, the term of this patent is extended or adjusted under 35 U.S.C. 154(b) by 1389 days.

(21) Appl. No.: 11/260,739

(22) Filed: Oct. 27, 2005

(65) Prior Publication Data

US 2007/0100676 A1    May 3, 2007

(51) Int. Cl.
*G06F 15/16* (2006.01)
*G06F 15/173* (2006.01)
*G06F 9/46* (2006.01)
*H04L 12/16* (2006.01)
*H04Q 11/00* (2006.01)

(52) U.S. Cl. ........ 709/223; 709/204; 709/225; 709/226; 718/100; 718/102; 370/260; 370/261

(58) Field of Classification Search ........................ None
See application file for complete search history.

(56) References Cited

U.S. PATENT DOCUMENTS

| 5,826,236 | A |   | 10/1998 | Narimatsu et al. |
| 5,933,417 | A | * | 8/1999  | Rottoo ........................... 370/260 |
| 6,088,367 | A |   | 7/2000  | Skells |
| 6,571,215 | B1 |   | 5/2003  | Mahapatro |
| 6,578,005 | B1 |   | 6/2003  | Lesaint et al. |
| 6,633,324 | B2 | * | 10/2003 | Stephens, Jr. .............. 348/14.09 |
| 6,748,364 | B1 | * | 6/2004  | Waytena et al. ................... 705/5 |
| 6,775,644 | B2 | * | 8/2004  | Myers ........................... 702/186 |
| 6,865,450 | B2 |   | 3/2005  | Masticola et al. |
| 7,197,319 | B2 | * | 3/2007  | Tiedemann et al. .......... 455/453 |
| 7,213,050 | B1 | * | 5/2007  | Shaffer et al. ................. 709/204 |

(Continued)

OTHER PUBLICATIONS

Yuan, L.; Tham, C.; Ananda, A.; "A Probing Approach for Effective Distributed Resource Reservation"; Quality of Service in Multiservice IP Networks: Second International Workshop, QoS-IP 2003, Milano, Italy, Feb. 24-26, 2003. Proceedings. p. 672-688.*

(Continued)

*Primary Examiner* — Emerson Puente
*Assistant Examiner* — Charles Swift
(74) *Attorney, Agent, or Firm* — Schmeiser, Olsen & Watts; William Schiesser (57) ABSTRACT

A method and system for optimally scheduling a web conference managed by a web application. Date and time ranges are initialized with predefined values. A tentative start date included in the date range and a tentative start time included in the time range are automatically calculated, and are included in a tentative schedule for the web conference. A time period is determined by the tentative schedule and a duration of the web conference. The automatic calculation prevents the time period from overlapping a time interval during which processors utilized by the web application are to experience a peak load. The tentative schedule is presented to the user via the interface, and is recalculated and redisplayed in response to the user updating a load-related parameter. The user selects a final schedule, which is the tentative schedule or a user-specified schedule different from the tentative schedule.

12 Claims, 5 Drawing Sheets

U.S. PATENT DOCUMENTS

| | | | |
|---|---|---|---|
| 7,328,264 B2* | 2/2008 | Babka | 709/226 |
| 7,343,313 B2* | 3/2008 | Dorenbosch et al. | 705/8 |
| 2002/0085490 A1* | 7/2002 | O'Neil | 370/229 |
| 2003/0046326 A1* | 3/2003 | Matsuura et al. | 709/102 |
| 2003/0125995 A1* | 7/2003 | Yamatari et al. | 705/5 |
| 2003/0208392 A1 | 11/2003 | Shekar et al. | |
| 2004/0010437 A1 | 1/2004 | Kiran et al. | |
| 2004/0199580 A1* | 10/2004 | Zhakov et al. | 709/204 |
| 2004/0204978 A1 | 10/2004 | Rayrole | |
| 2005/0071212 A1 | 3/2005 | Flockhart et al. | |
| 2005/0076043 A1 | 4/2005 | Benedetti et al. | |
| 2005/0180342 A1* | 8/2005 | Summers et al. | 370/261 |
| 2006/0184944 A1* | 8/2006 | Schwerk | 718/101 |
| 2006/0293943 A1* | 12/2006 | Tischhauser et al. | 705/9 |
| 2007/0127527 A1* | 6/2007 | Dan et al. | 370/477 |
| 2010/0030389 A1* | 2/2010 | Palmer et al. | 700/284 |

OTHER PUBLICATIONS

T. Roblitz, F. Schintke, and J. Wendler. Elastic Grid Reservations with User-Defined Optimization Policies. In Proc. of the Workshop on Adaptive Grid Middleware, 2004.*

Sallabi, F.; Karmouch, A.; , "New resource reservation architecture with user interactions," Communications, Computers and Signal Processing, 1999 IEEE Pacific Rim Conference on , vol., No., pp. 456-459, 1999 doi: 10.1109/PACRIM.1999.799574.*

* cited by examiner

| | |
|---|---|
| WEB CONFERENCE NAME | [__________] —302 |
| MODERATOR | [________][CHANGE...] —304 |
| WEB CONFERENCE TYPE | [COLLABORATION ▼] —306 |

308 {
- ☑ WHITEBOARD
- ☑ SCREEN SHARING
- ☑ CHAT
- ☑ AUDIO CONFERENCE

EXPECTED PARTICIPANTS  ◀ [    4] ▶  —310

DURATION  ◀ [1] ▶ HOURS  ◀ [0] ▶ MINUTES   —312

SCHEDULE

DATE (mm/dd/yyyy)  ◀ [  ][  ][2005] ▶ [▦]   —314

TIME  ◀ [  ][  ][PM] ▶   —316

[SAVE] [CANCEL]

METHOD AND SYSTEM FOR OPTIMALLY SCHEDULING A WEB CONFERENCE MANAGED BY A WEB APPLICATION

TECHNICAL FIELD

The present invention relates to scheduling a web application-related user activity and more particularly to a technique for automatically generating an optimal and tentative schedule for a web application-related user activity to avoid excessive loads on the web application, and providing an end user with an option to supersede the tentative schedule.

BACKGROUND OF THE INVENTION

In hosted web applications, usage of resources (e.g., central processor unit, random access memory, disk, and network) can change significantly in response to the activity of end users at any given point in time. Furthermore, web applications are known to attain a non-recoverable application server error state under a user load exceeding some application-specific threshold. Conventional infrastructure and application provisioning processes can make additional resources (e.g., servers) available, but these provisioning processes can span a considerable period of time, ranging from several minutes to several hours. Thus, a reactive approach to resource provisioning under increased user load is impracticable. Accordingly, there exists a need in the art to overcome the deficiencies and limitations described hereinabove.

SUMMARY OF THE INVENTION

In first embodiments, the present invention provides a method of optimally scheduling an activity managed by a web application in a network computing environment, comprising:

initializing a date range with a plurality of predefined dates and a time range with a plurality of predefined times,
  wherein the date range and the time range define a plurality of time intervals within which the activity is capable of occurring,
  wherein the activity is to be performed by one or more users of a plurality of users capable of accessing the web application, and
  wherein the activity is to utilize one or more resources managed by the web application;

receiving, from a user of the plurality of users, and via an interface provided by a web browser utilized by the user, a duration required for the activity to be performed completely by the one or more users, automatically calculating a tentative start date included in the date range and a tentative start time included in the time range, wherein a tentative schedule for the activity comprises the tentative start date and the tentative start time,
  wherein the tentative start date, the tentative start time and the duration determine a time period, and
  wherein the calculating prevents the time period from overlapping a time interval during which the web application is to experience a peak load, the time interval included in the plurality of time intervals; and receiving, from the user via the interface, a selection of a final schedule of the activity, the final schedule being one of the tentative schedule and a specified schedule,
  wherein the specified schedule comprises one of:
    a start date specified by the user via the interface and a start time specified by the user via the interface,
    the start date specified by the user via the interface and the tentative start time, and
    the tentative start date and the start time specified by the user via the interface,
  wherein the start date is different from the tentative start date and the start time is different from the tentative start time.

In second embodiments, the present invention provides a system for optimally scheduling an activity managed by a web application in a network computing environment, comprising:

means for initializing a date range with a plurality of predefined dates and a time range with a plurality of predefined times,
  wherein the date range and the time range define a plurality of time intervals within which the activity is capable of occurring,
  wherein the activity is to be performed by one or more users of a plurality of users capable of accessing the web application, and
  wherein the activity is to utilize one or more resources managed by the web application;

means for receiving, from a user of the plurality of users, and via an interface provided by a web browser utilized by the user, a duration required for the activity to be performed completely by the one or more users, means for automatically calculating a tentative start date included in the date range and a tentative start time included in the time range, wherein a tentative schedule for the activity comprises the tentative start date and the tentative start time,
  wherein the tentative start date, the tentative start time and the duration determine a time period, and
  wherein the calculating prevents the time period from overlapping a time interval during which the web application is to experience a peak load, the time interval included in the plurality of time intervals; and means for receiving, from the user via the interface, a selection of a final schedule of the activity, the final schedule being one of the tentative schedule and a specified schedule,
  wherein the specified schedule comprises one of:
    a start date specified by the user via the interface and a start time specified by the user via the interface,
    the start date specified by the user via the interface and the tentative start time, and
    the tentative start date and the start time specified by the user via the interface,
  wherein the start date is different from the tentative start date and the start time is different from the tentative start time.

In third embodiments, the present invention provides a computer program product comprising a computer-usable medium including computer-usable program code for optimally scheduling an activity managed by a web application in a network computing environment, the computer program product including:

computer-usable code for initializing a date range with a plurality of predefined dates and a time range with a plurality of predefined times,
  wherein the date range and the time range define a plurality of time intervals within which the activity is capable of occurring,
  wherein the activity is to be performed by one or more users of a plurality of users capable of accessing the web application, and
  wherein the activity is to utilize one or more resources managed by the web application;

computer-usable code for receiving, from a user of the plurality of users, and via an interface provided by a web browser utilized by the user, a duration required for the activity to be performed completely by the one or more users, computer-usable code for automatically calculating a tentative start date included in the date range and a tentative start time included in the time range, wherein a tentative schedule for the activity comprises the tentative start date and the tentative start time,
- wherein the tentative start date, the tentative start time and the duration determine a time period, and
- wherein the calculating prevents the time period from overlapping a time interval during which the web application is to experience a peak load, the time interval included in the plurality of time intervals;

computer-usable code for receiving, from the user via the interface, a selection of a final schedule of the activity, the final schedule being one of the tentative schedule and a specified schedule,
- wherein the specified schedule comprises one of:
  - a start date specified by the user via the interface and a start time specified by the user via the interface,
  - the start date specified by the user via the interface and the tentative start time, and
  - the tentative start date and the start time specified by the user via the interface,
- wherein the start date is different from the tentative start date and the start time is different from the tentative start time.

In fourth embodiments, the present invention provides a method for deploying computing infrastructure, comprising integrating computer-readable code into a computing system, wherein the code in combination with the computing system is capable of performing a process of optimally scheduling an activity managed by a web application in a network computing environment, the process comprising:

initializing a date range with a plurality of predefined dates and a time range with a plurality of predefined times,
- wherein the date range and the time range define a plurality of time intervals within which the activity is capable of occurring,
- wherein the activity is to be performed by one or more users of a plurality of users capable of accessing the web application, and
- wherein the activity is to utilize one or more resources managed by the web application;

receiving, from a user of the plurality of users, and via an interface provided by a web browser utilized by the user, a duration required for the activity to be performed completely by the one or more users, automatically calculating a tentative start date included in the date range and a tentative start time included in the time range, wherein a tentative schedule for the activity comprises the tentative start date and the tentative start time,
- wherein the tentative start date, the tentative start time and the duration determine a time period, and
- wherein the calculating prevents the time period from overlapping a time interval during which the web application is to experience a peak load, the time interval included in the plurality of time intervals; and receiving, from the user via the interface, a selection of a final schedule of the activity, the final schedule being one of the tentative schedule and a specified schedule,
- wherein the specified schedule comprises one of:
  - a start date specified by the user via the interface and a start time specified by the user via the interface,
  - the start date specified by the user via the interface and the tentative start time, and
  - the tentative start date and the start time specified by the user via the interface,
- wherein the start date is different from the tentative start date and the start time is different from the tentative start time.

Advantageously, the present invention provides a tentative, optimal schedule for a user activity to avoid peak loads on a web application, and allows an end user to accept the tentative schedule or replace it with another schedule input by the end user. Further, the optimal schedule dynamically changes on an interface presented to the end user in response to the end user updating input fields included in the interface.

BEST MODE FOR CARRYING OUT THE INVENTION

Figure 1:
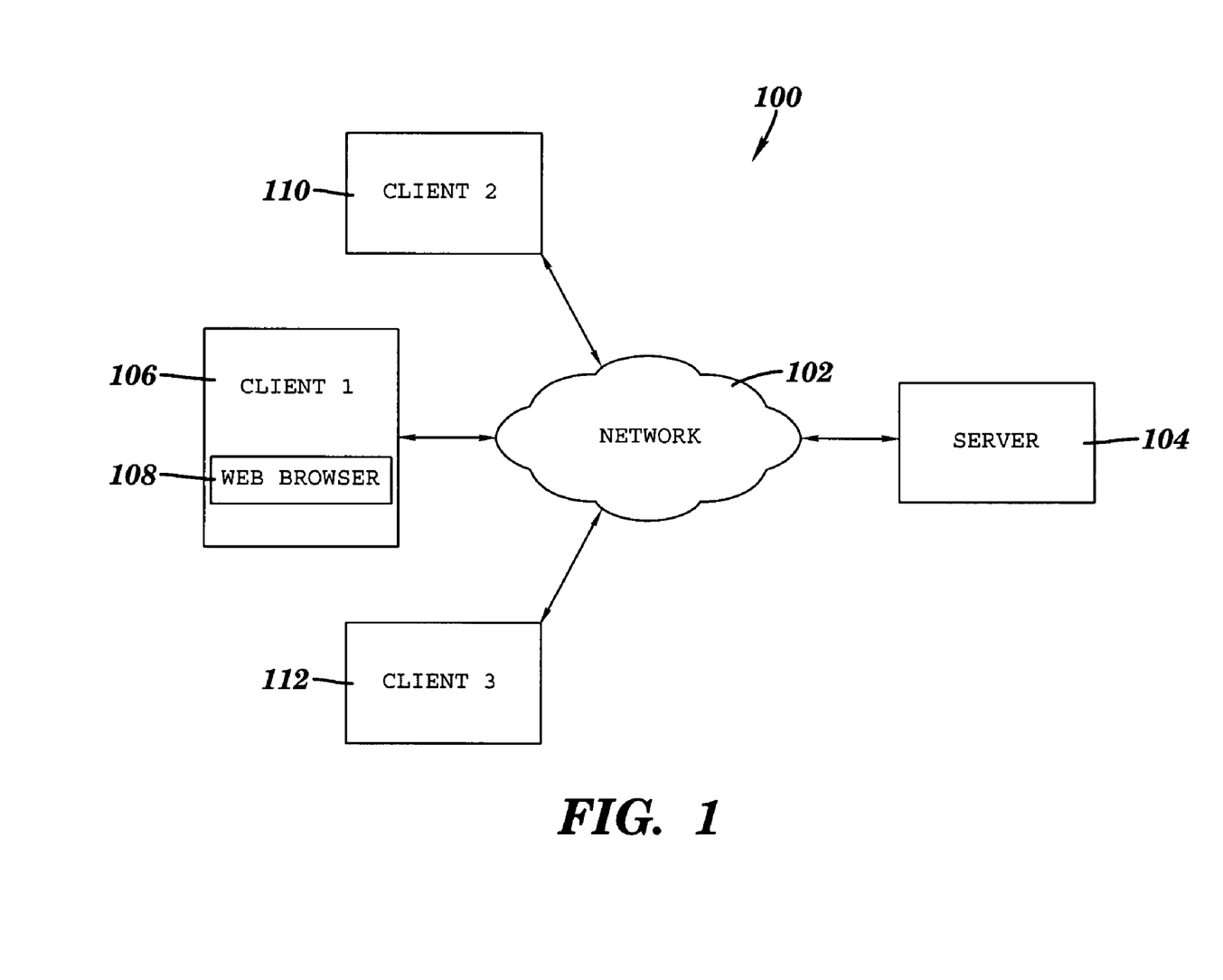
FIG. 1 is a block diagram of a system for optimally scheduling a user activity related to a web application, in accordance with embodiments of the present invention.

FIG. 1 is a block diagram of a system for optimally scheduling a user activity related to a web application, in accordance with embodiments of the present invention. Network computing system 100 is a network of computing units in which the present invention may be implemented. System 100 includes a network 102, which is the medium used to provide communications links between various devices and computing units connected together within system 100. Network 102 comprises any type of communications link, and may include connections, such as wire, wireless communication links, or fiber optic cables. Network 102 can comprise an addressable connection in a client-server environment. Further, network 102 comprises any type of network, including the Internet, a wide area network (WAN), a local area network (LAN), or a virtual private network (VPN).

In the depicted example, a server computing unit (e.g., web server) 104 is connected to network 102 along with a client computing unit 106 that includes a web browser (e.g., Microsoft® Internet Explorer®) 108. Clients 110 and 112 are also connected to network 102 and may each include a web browser (not shown). System 100 may include additional servers, clients, and devices (e.g., storage devices) not shown. Server 104 and clients 106, 108, 112 utilize conventional network connectivity (e.g., Ethernet, Token Ring, or WiFi). Server 104 comprises any type of computing unit capable of communicating with one or more other computing units (e.g., client 106). Server 104 is, for example, a WebSphere® server available from International Business Machines Corporation of Armonk, N.Y.

Clients 106, 110, 112 are clients to server 104, and comprise any type of computing unit capable of communicating with server 104 via network 102. Examples of client 106 include a personal computer, laptop computer, handheld device, etc. Although not shown, client 106 typically includes components (e.g., central processing unit, memory, etc.) similar to components of server 104, which are described below relative to FIG. 5.

In the depicted example, server 104 provides data such as web pages and applications to clients 106, 110, 112. A user (not shown) utilizing client 106 interacts with a web application provided by server 104 via an interface provided by web browser 108. As used herein, a user is equivalent to an end user and is defined as a person who utilizes a fully developed computer application (e.g., the web application provided by server 104) via an interface. As used herein, a web application is a software application delivered to users from a server over a network such as the Internet or an intranet.

Figure 2:
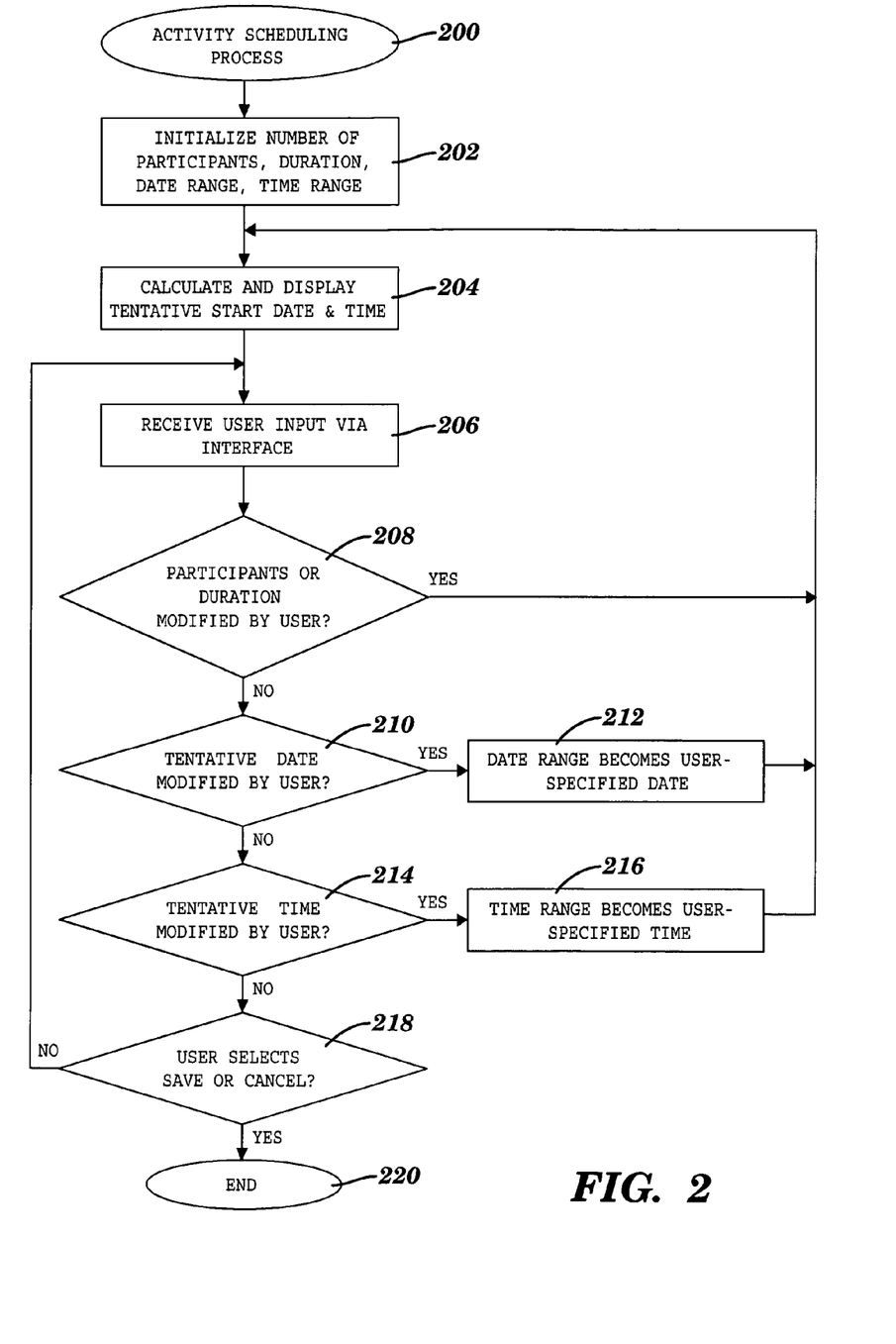
FIG. 2 is a flow chart of a method for optimally scheduling a user activity related to a web application that is implemented in the system of FIG. 1, in accordance with embodiments of the present invention.

FIG. 2 is a flow chart of a method for optimally scheduling a user activity related to a web application that is implemented in the system of FIG. 1, in accordance with embodiments of the present invention. The activity scheduling method begins at step 200 and is provided by an activity scheduling system residing on server 104 (see FIG. 1). Although FIG. 2 illustrates a process during which a user schedules a web conference, one skilled in the art will recognize that the process can be applied to the scheduling of other types of activities in advance of performing those activities by one or more end users, where the other types of activities utilize one or more resources managed by a web application. As used herein, a resource is defined as time, information, objects (i.e., information containers), or processors used or consumed by the activity being scheduled, and managed by the web application provided by server 104 (see FIG. 1). Examples of resources include CPU time, terminal connect time, amount of directly-addressable memory, disk space, and the number of input/output requests per minute.

In web applications, resource overbooking is possible. As overbooking of a resource occurs, the end users performing the activity that utilizes the resource continue to be serviced by server 104 (see FIG. 1), but the overall quality of service deteriorates (e.g., end users using clients 106, 110, 112 of FIG. 1 experience a slower response time). Further, the present invention requires that multiple end users scheduling the same type of activity use the same web application provided by server 104 (see FIG. 1), and the scheduled activities to be performed by the multiple end users contend for the same one or more resources or the same type of resources.

At step 202, the activity scheduling method initializes the number of participants (e.g., of the web conference), the duration of the activity (e.g., the web conference), a range of dates (a.k.a. date range), and a range of times (a.k.a. time range). The participants are the one or more end users who are to perform the activity being scheduled. The one or more end users are included in a plurality of end users that are capable of accessing the web application that manages the activity being scheduled. In one embodiment, the date range is a data structure containing two members for storing a start date (e.g., earliest date) and an end date (e.g., latest date) of the range of dates. Further, the time range is a data structure containing two members for storing a start time (e.g., earliest time) and an end time (e.g., latest time) of the range of times.

The date range and the time range are initialized by the activity scheduling method with the values which define a time interval within which the user activity is capable of occurring and is reasonably likely to occur. In one embodiment, the date range's start date is initialized to the current date and the date range's end date is set to be a predefined number of days (e.g., seven) after the start date. In one embodiment, the time range is initialized with a start time and end time indicating the start of the end user's business day and the end of the end user's business day, respectively, taking in account the time zone in which the end user is located.

In step 204, a tentative date (a.k.a. tentative start date) and a tentative time (a.k.a. tentative start time), each associated with the date range, time range, number of participants and duration initialized in step 202, are automatically calculated and displayed on an interface viewed by the end user at client 106 via web browser 108. The tentative date and tentative time are calculated to be optimal from the perspective of the web application's usage of the one or more resources. This automatic calculation is performed by the activity scheduling system of server 104 (see FIG. 1). The automatically calculated tentative date and the automatically calculated tentative time are herein referred to collectively as the tentative schedule of the activity. The tentative date and tentative time, along with the duration of the activity input in step 202 determine a time period of the activity that starts at the tentative time on the tentative date, and extends for a block of time equal to the duration. The tentative date and tentative time are calculated to be within the date range and time range of step 202, respectively.

The tentative date and tentative time are optimal in the sense that they are calculated to ensure that the time period of the activity does not overlap a time block during which the web application is expected to experience a peak load (i.e., a peak usage of the one or more resources utilized by the activity being scheduled). A peak load is greater than other loads expected to be experienced by the web application during any other time block defined by the date and time ranges of step 202.

In a preferred embodiment, the tentative date and tentative time are calculated to ensure that the time period of the activity is placed within a time block of a plurality of time blocks of equal duration defined within the date and time ranges initialized in step 202, and during which the web application is expected to experience the least load (i.e., a load that is less than or equal to the loads expected to be experienced by the web application during the other time blocks of the plurality of time blocks). The expected loads in the preferred embodiment are based on, for example, previously scheduled activities that are to utilize the one or more resources during one of the time blocks of the plurality of time blocks. One example of a process that calculates the tentative date and time is discussed below relative to FIG. 4.

In step 206, end user input entered at client 106 (see FIG. 1) via a web browser-provided interface (e.g., the interface of step 204) is received by server 104 (see FIG. 1). If inquiry 208 determines that the end user input of step 206 changes interface-displayed parameters that affect the load on the web application that manages the activity being scheduled (e.g., number of participants for the activity, duration of the activity, type of activity, tools required by the activity), the process of FIG. 2 loops back to step 204 to recalculate the tentative date and time, and to display the recalculated values of the tentative date and time on the interface. In this way, the end user's changes to certain load-related parameters that are included on the interface cause a dynamic change to the fields of the interface that display the tentative date and tentative time for the activity. For example, a change in the duration from one hour to two hours may cause the time period determined by the suggested date and time to overlap a peak load time period. The process of FIG. 2 avoids placing the web conference time period during a peak load time period, so a new tentative date and time is calculated in this example to avoid the peak load period. The interface utilized by the end user to update the load-related parameter(s), and which displays dynamic updates of the tentative date and time of the web conference is discussed below relative to FIG. 3.

The process of FIG. 2 allows the end user to make a final decision regarding the scheduling of the activity. The end user's input in step 206 may preserve or override the initial step 204 calculation of the tentative date and/or tentative time by the activity scheduling system. The end user overrides the automatically calculated tentative date or time by entering a new date or time in input fields of the interface of step 206. If inquiry 208 determines that the number of participants and the duration have not been modified by the end user, then inquiry 210 determines if the end user modified the tentative date by entering, in step 206, a different, user-specified date in an input field of the interface displayed on client 106 (see FIG. 1). If the tentative date was modified by the user inputting a user-specified date, the date range is assigned in step 212 to the value of the user-specified date (e.g., the start date and the end date of the date range are both assigned to the user-specified date).

If inquiry 210 determines that the user did not modify the tentative date, then inquiry 214 determines if the user modified the tentative time in step 206. If the user modified the tentative time by entering a different, user-specified time in an input field of the interface displayed on client 106, the time range is assigned in step 216 to the value of the user-specified time (e.g., the start time and the end time of the time range are both assigned to the user-specified time).

After step 212 and step 216, the process of FIG. 2 loops back to step 204 to recalculate the tentative start date and tentative start time. The recalculated tentative start date and tentative start time are displayed on the interface, which is viewable by the end user via web browser 108 (see FIG. 1).

If inquiry 214 determines that the user did not modify the tentative time, then inquiry 218 determines if the user indicates on the interface of step 206 that the processing is complete. For example, the user selects Save or Cancel to save or cancel the tentative date and time displayed on the interface. The user selection can be made, for example, with a pointing device. If the user does not indicate that the processing is complete, then the process repeats starting at step 206, at which the user can modify input fields on the interface as described above. If the user indicates in step 218 that the scheduling process is complete, then the process of FIG. 2 ends at step 220. If the user indicates that the processing is to be saved (e.g., by selecting Save), the tentative date and tentative time are saved, respectively, as the end user's final scheduled date and final scheduled time for the activity, which are collectively referred to as the final schedule of the activity.

The final schedule of the activity can be either the tentative schedule (i.e., the automatically calculated tentative date and time), or an end user-specified schedule. An end user-specified schedule comprises (1) a start date specified by the end user via the interface in step 206 and a start time specified by the end user via the interface in step 206; (2) a start date specified by the end user via the interface in step 206 and the tentative start time of the tentative schedule; or (3) the tentative start date of the tentative schedule and a start time specified by the end user via the interface in step 206. If the end user-specified schedule includes an end user-specified start date, the end user-specified start date is different from the tentative start date of the tentative schedule. If the end user-specified schedule includes an end user-specified start time, the end user-specified start time is different from the tentative start time of the tentative schedule.

In a preferred embodiment, the final scheduled date and final scheduled time are not updateable by the activity scheduling system or the web application that manages the activity being scheduled.

In an alternate embodiment, the activity scheduling system provided by server 104 (see FIG. 1) includes a billing model that assigns a monetary charge to the end user for the one or more resources utilized by the activity. The monetary charge (e.g., a per minute charge for using a computing resource) is reduced or eliminated in response to the user selecting the automatically calculated tentative date and tentative time as the final schedule of the activity (i.e., the end user saves the tentative date and time without the process ever determining in steps 210 and 214 that the tentative date or tentative time had been modified in step 206). The reduction or elimination of the charge serves as an incentive for the end user to select the tentative, optimal date and the tentative, optimal time, rather than specifying another date and/or time which may schedule the activity during a peak load time period.

Figure 3:
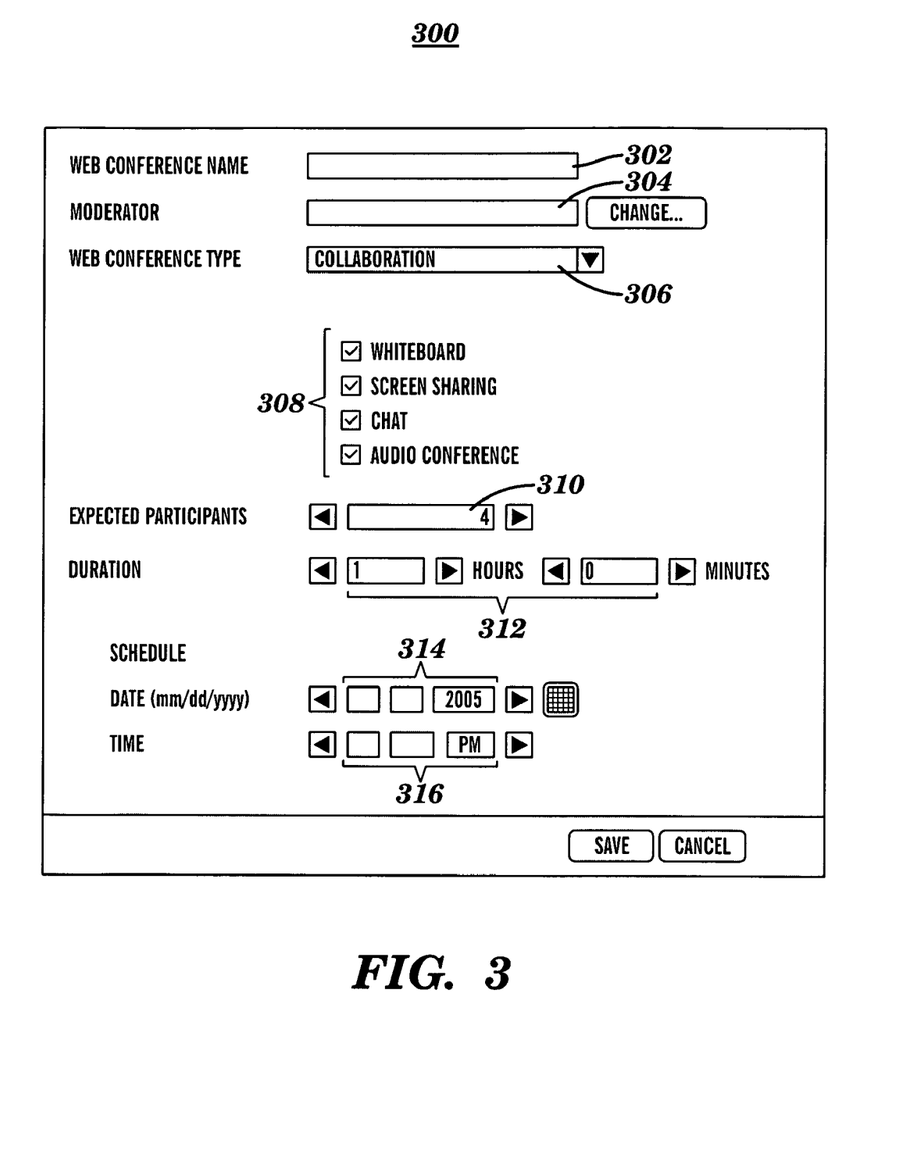
FIG. 3 depicts an end user interface utilized in the process of FIG. 2, in accordance with embodiments of the present invention.

FIG. 3 depicts an end user interface utilized by the process of FIG. 2 (e.g., step 206 of FIG. 2), in accordance with embodiments of the present invention. In the example depicted in FIG. 3, a graphical user interface (GUI) 300 is displayed on a screen at client 106 (see FIG. 1), and is being used by an end user to schedule a web conference. Interface 300 groups input and display fields as follows:

(a) Informational fields (e.g., web conference name 302, moderator name 304) are input fields that do not affect the load on the web application provided by server 104.

(b) Web application parameter fields (e.g., web conference type 306, checkboxes 308 for software-based tools or features to be used during the web conference, number of expected participants 310, and the conference duration 312) are input fields for factors that affect the load on the web application. Examples of tools or features that can be used during a web conference include a whiteboard, screen sharing, a chat feature, and an audio conference.

(c) Schedule fields display the tentative date 314 and tentative time 316 scheduled for the web conference. Date field 314 also accepts a user-specified date as input. Time field 316 also accepts a user-specified time as input.

In one embodiment, the web application enforces the order in which the end user fills in the input fields of interface 300.

Program code residing at server 104 (see FIG. 1) executes to calculate and display the tentative date and time of the activity in schedule fields 314, 316, respectively, of interface 300. The optimal date and time dynamically changes in schedule fields 314, 316 of interface 300 in response to the end user updating one or more web application parameter fields 306, 308, 310, 312 on interface 300. The tentative time is an optimal time in terms of avoiding peak loads on the web application, and is further constrained by being a time within the end user's normal business hours, and within the date and time ranges specified by the end user. The end user accepts the tentative date and time as the final schedule of the activity (e.g., by selecting the Save button), or enters another date in field 314 and/or another time in field 316 based upon the preferences of the end user. If another date is entered, the new date replaces the automatically calculated tentative date in the final schedule of the activity. Similarly, if another time is entered, the new time replaces the automatically calculated tentative time in the final schedule of the activity.

Calculation of Tentative Schedule—Based on Planned Resource Allocation

Figure 4:
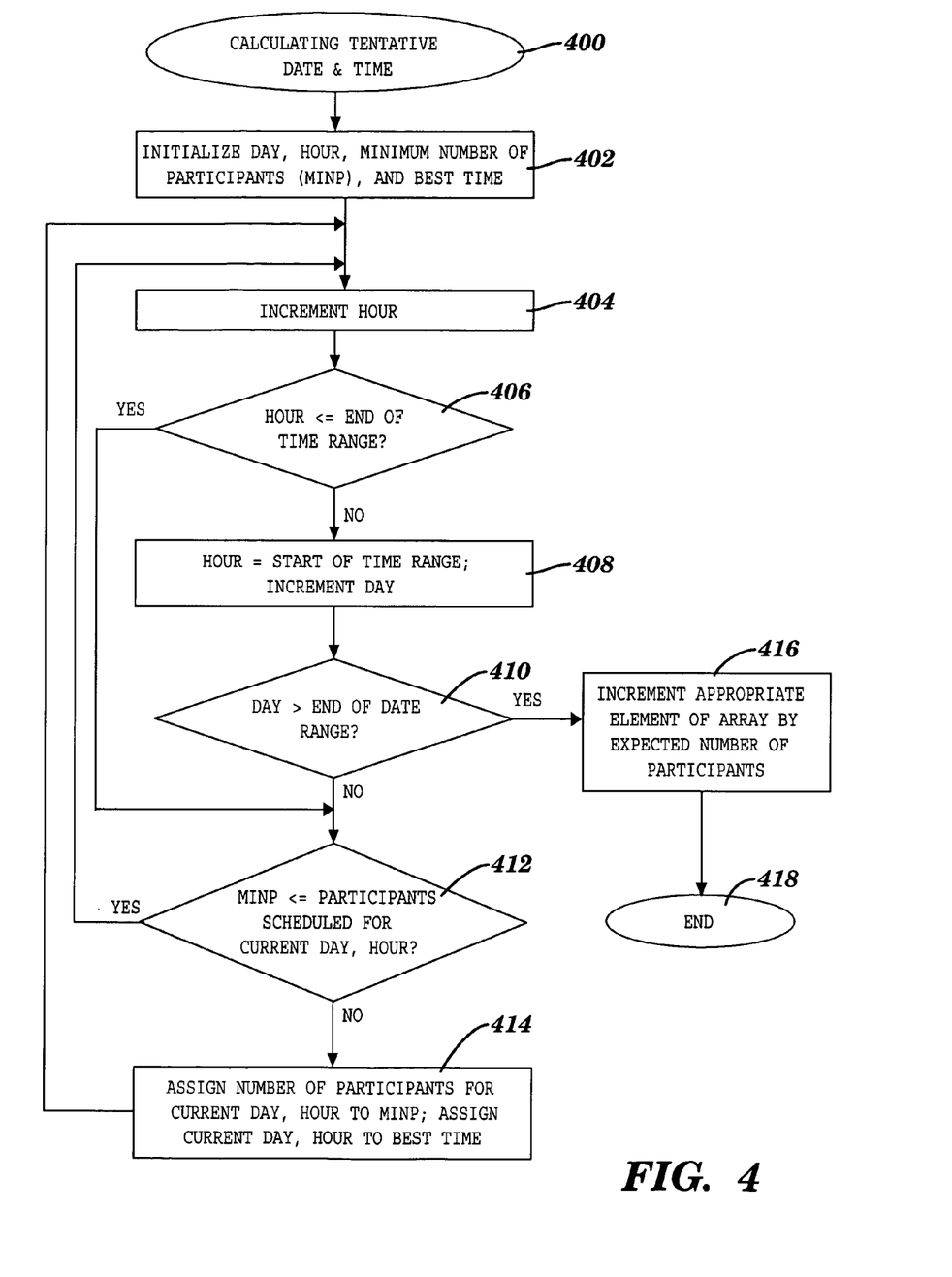
FIG. 4 is a flow chart of a process for calculating a tentative start date and time for the user activity scheduling of FIG. 2, in accordance with embodiments of the present invention.

FIG. 4 is a flow chart of a process for calculating a tentative start date and time for the user activity scheduling of FIG. 2, in accordance with embodiments of the present invention.

The process of FIG. 4 starts at step 400 and calculates the tentative date and time of step 204 (see FIG. 2) based upon planned resource allocation. The input parameters to the process of FIG. 4 are the date and time ranges, the number of expected participants, and the duration of the activity, which are provided by step 202 of FIG. 2. The process returns the tentative, optimal start date and time within the specified date and time ranges. Further, the calculation of a tentative start time in this example iterates through all the hours within the specified date range and time range, searching for an hour during which a minimum number of participants is already scheduled.

The process of FIG. 4 uses the following terms:

Day and Hour are variables holding the current values of the day and hour, respectively, during the iterations of the process of FIG. 4.

MinP is an integer variable holding the value of the minimum number of participants for any hour within the dates and times through which the process of FIG. 4 has iterated.

BestTime is a data structure including two members for storing the date and time for which the number of participants is MinP.

ParticipantsScheduled(Day, Hour) is an array of integers storing the number of participants scheduled for the activity for any given date and hour.

GetParticipantsScheduled(Day, Hour, Duration) is a subroutine returning the number of participants scheduled for the activity for any given Day, Hour and Duration of the activity by calculating the sum of participants stored in the ParticipantsScheduled array for the range starting from (Day, Hour) and ending with (Day, Hour+Duration−1).

In step 402, the values of Day, Hour, MinP and BestTime are initialized. Day and Hour are initialized to be the first date of the date range and the first time of the time range, respectively, which are provided by step 202 of FIG. 2. MinP is initialized to a value returned by the GetParticipantsScheduled( ) subroutine that determines the number of participants already scheduled for the activity based on the initialized values of the Day and Hour variables, and the Duration provided by step 202 (see FIG. 2). BestTime is initialized to a data structure storing the initialized values of Day and Hour.

In step 404, Hour is incremented to the next block of time. Since this example checks the number of participants in one-hour blocks of time, Hour is incremented by one. Inquiry step 406 determines if the value of Hour is less than or equal to the last time of the time range provided by step 202 of FIG. 2 (i.e., there are one or more time blocks remaining to check in the current date of the current iteration of the process of FIG. 4). If the answer to inquiry 406 is Yes, the process continues with inquiry 412, which is described below; otherwise, Hour is assigned to the value of the first time of the time range and Day is incremented by one at step 408. Following step 408, inquiry 410 ascertains whether the value of Day exceeds the last date of the date range. If Day exceeds the last date of the date range, the process has completed its iterations through the given date and time ranges, and step 416 increments the appropriate element of the ParticipantsScheduled array (i.e., the element corresponding to Day and Hour stored in BestTime). Following step 416, the process of FIG. 4 ends at step 418.

Returning to inquiry 410, if the value of Day does not exceed the last date of the date range, inquiry 412 determines if MinP is less than or equal to the number of participants scheduled based on the values of Day, Hour and Duration in the current iteration (i.e., determines if the value of MinP is still the minimum number of participants based on the current iteration). The number of participants scheduled is determined by the GetParticipantsScheduled( ) subroutine described above. The process also reaches inquiry 412 if the value of Hour in inquiry 406 is less than or equal to the last time of the time range. If inquiry 412 determines that MinP is less than or equal the number of participants scheduled based on the values of Day, Hour and Duration in the current iteration, then the process repeats starting at step 404; otherwise, in step 414 the MinP variable is assigned the number of participants scheduled for the current Day, Hour and Duration, and the BestTime variable is assigned the values of the current Day and Hour. Following step 414, the process loops back to step 404.

Calculation of Tentative Schedule—Based on Historical Data

If the end user schedules an activity for a period of time during which other users' activities are either absent or minimal, the calculation process of FIG. 4 may not produce optimal results. For instance, the process may suggest a time slot with little or no user activity planned at the time of scheduling, but which can become overbooked later. To avoid this scenario, variations of the process of FIG. 4 takes into account historical data regarding past usage of the one or more resources associated with the activity being scheduled or past performances of the activity by end users.

As one example of a variation of the process of FIG. 4 that uses historical data, the number of participants scheduled for a comparable time slot in the past is added to the value returned by the GetParticipantsScheduled( ) subroutine in steps 402, 412 and 414. As used herein, a comparable time slot is defined to be a time slot in the past that has a user activity pattern similar to the time slot defined by the current values of Day and Hour. For example, the number of participants for a comparable time slot may include the number of participants for: (1) the same day of the week for the most recent previous week, (2) the same day of the week averaged for several weeks, (3) the same date last year adjusted to the closest business/non-business day, or (4) the same date averaged for several years, with the date being adjusted to the closest business/non-business day.

A more complicated and reliable method of taking historical data into account requires adding to the value returned by the GetParticipantsScheduled( ) subroutine, the weighted sum of the number of participants scheduled for comparable time slots in the past (e.g., the same day of the week for m past weeks), which is shown below in (1):

$$\sum_{j=1,\ldots m} k_j p_j \quad (1)$$

where m is the number of comparable time slots for which the historical data is collected, $k_j$ is the j-th weight coefficient, so that $$\sum_{j=1,\ldots m} k_j = 1, \text{ and}$$

$p_j$ is the number of participants scheduled for the j-th comparable time slot.

The values of the weight coefficients are determined by equation (2), which minimizes the squared deviation of the weighted sum of the number of participants scheduled for comparable time slots in the past (e.g., the same day of the week for m past weeks) from the number of participants scheduled for the closest past comparable time slot:

$$(k_1 \ldots k_m) = \operatorname{argmin} \sum_{i=1,\ldots n} \left( \sum_{j=1,\ldots m} k_j p_{ij} - s_i \right)^2 \quad (2)$$

where $k_1 \ldots k_m$ are weight coefficients, n is the number of most recent comparable time slots for which the historical data is summed (e.g., n=7 to indicate every day of the last week), m is the number of time periods (e.g., weeks) during which comparable time slots are considered, $p_{ij}$ is the number of participants scheduled for ij-th comparable time slot (e.g., Friday two weeks ago), and $s_i$ is the number of participants scheduled for the most recent comparable time slot (e.g., Friday of last week).

It will be apparent to those skilled in the art that available methods may be applied to find the minimum in equation (2).

Figure 5:
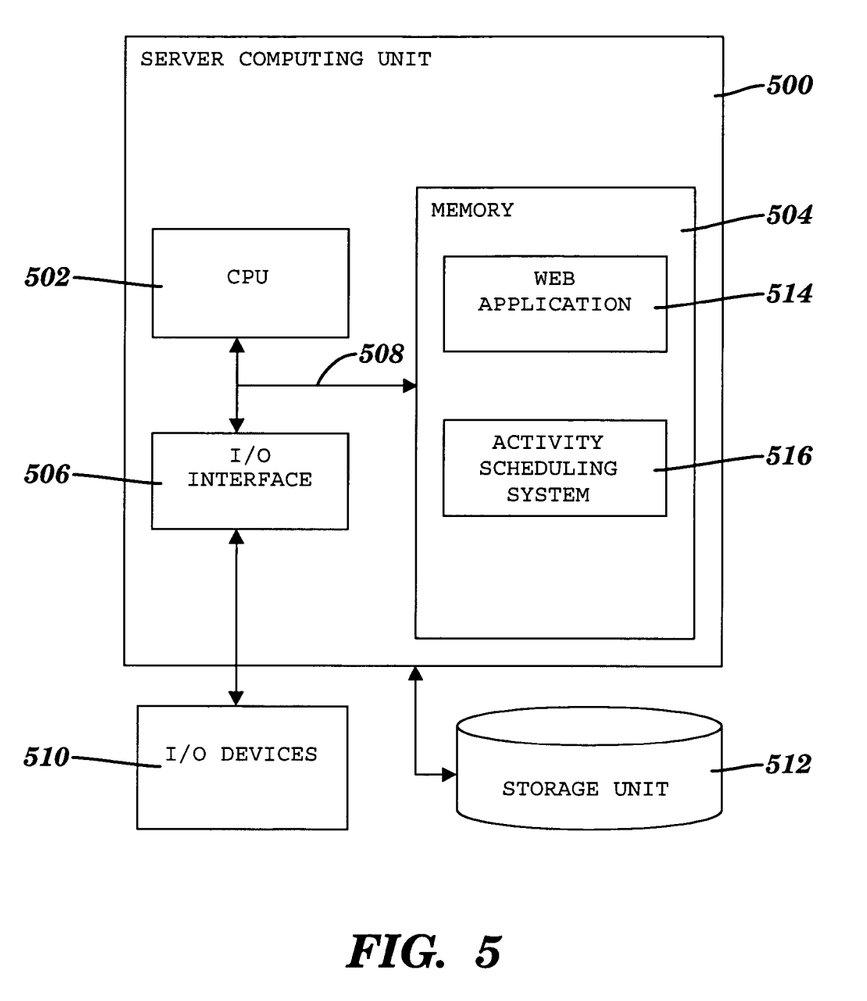
FIG. 5 is a block diagram of a computing system included in the system of FIG. 1, in accordance with embodiments of the present invention.

FIG. 5 is a block diagram of a computing system included in the system of FIG. 1, in accordance with embodiments of the present invention. Server computing unit 500 may be implemented as server 104 (see FIG. 1). Server computing unit 500 generally comprises a central processing unit (CPU) 502, a memory 504, an input/output (I/O) interface 506, a bus 508, I/O devices 510 and a storage unit 512. CPU 502 performs computation and control functions of server 500. CPU 502 may comprise a single processing unit, or be distributed across one or more processing units in one or more locations (e.g., on a client and server). Memory 504 may comprise any known type of data storage media, including magnetic media, optical media, random access memory (RAM), read-only memory (ROM), a data cache, a data object, etc. Storage unit 512 is, for example, a magnetic disk drive or an optical disk drive. Moreover, similar to CPU 502, memory 504 may reside at a single physical location, comprising one or more types of data storage, or be distributed across a plurality of physical systems in various forms. Further, memory 504 can include data distributed across, for example, a LAN, WAN or storage area network (SAN) (not shown).

I/O interface 506 comprises any system for exchanging information to or from an external source. I/O devices 510 comprise any known type of external device, including a display monitor, keyboard, mouse, printer, speakers, handheld device, printer, facsimile, etc. Bus 508 provides a communication link between each of the components in server 500, and may comprise any type of transmission link, including electrical, optical, wireless, etc.

I/O interface 506 also allows server 500 to store and retrieve information (e.g., program instructions or data) from an auxiliary storage device, such as a non-volatile storage device (e.g., a CD-ROM drive which receives a CD-ROM disk) (not shown). Server 500 can store and retrieve information from other auxiliary storage devices (not shown), which can include a direct access storage device (DASD) (e.g., hard disk or floppy diskette), a magneto-optical disk drive, a tape drive, or a wireless communication device.

Memory 504 includes computer program code comprising a web application 514 that manages one or more computing resources utilized by an end user activity, and an end user activity scheduling system 516 that optimally schedules the end user activity that utilizes the one or more computing resources. Further, memory 504 may include other systems not shown in FIG. 5, such as an operating system (e.g., Linux) that runs on CPU 502 and provides control of various components within and/or connected to server 500.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code 514, 516 for use by or in connection with a computing unit 500 or any instruction execution system to provide and facilitate the capabilities of the present invention. For the purposes of this description, a computer-usable or computer-readable medium can be any apparatus that can store the program for use by or in connection with the instruction execution system, apparatus, or device.

The medium can be an electronic, magnetic, optical, electromagnetic, infrared, or semiconductor system (or apparatus or device). Examples of a computer-readable medium include a semiconductor or solid state memory, magnetic tape, a removable computer diskette, RAM 504, ROM, a rigid magnetic disk and an optical disk. Current examples of optical disks include compact disk-read-only memory (CD-ROM), compact disk-read/write (CD-R/W) and DVD.

A computing system 500 suitable for storing and/or executing program code 514, 516 include at least one processor 502 coupled directly or indirectly to memory elements 504 through a system bus 508. The memory elements can include local memory employed during actual execution of the program code, bulk storage, and cache memories which provide temporary storage of at least some program code in order to reduce the number of times code must be retrieved from bulk storage during execution.

Furthermore, the present invention discloses a method for deploying or integrating computing infrastructure, comprising integrating computer-readable code into computer system 500, wherein the code in combination with computer system 500 is capable of optimally scheduling an activity managed by a web application. The disclosed method for deploying or integrating computing infrastructure with the capabilities described herein can be offered as a service on a subscription service.

The flow diagrams depicted herein are provided by way of example. There may be variations to these diagrams or the steps (or operations) described herein without departing from the spirit of the invention. For instance, in certain cases, the steps may be performed in differing order, or steps may be added, deleted or modified. All of these variations are considered a part of the present invention as recited in the appended claims.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A method of optimally scheduling a web conference managed by a web application, said method comprising:

a computer system scheduling a plurality of web conferences other than said web conference;

said computer system initializing a duration during which said web conference is to be completed, a number of users to be included in said web conference, a date range with a plurality of predefined dates and a time range with a plurality of predefined times, wherein said web conference is to be scheduled within said date range and within said time range, wherein said plurality of web conferences are scheduled within said initialized date range and said initialized time range, and wherein said web conference and said plurality of web conferences other than said web conference are to utilize one or more computer processors managed by said web application;

said computer system determining a plurality of equal time intervals within said initialized date range and said initialized time range;

said computer system determining a plurality of expected loads to be experienced by said one or more computer processors during said plurality of equal time intervals, said plurality of expected loads based on expected utilization of said one or more computer processors by said plurality of web conferences other than said web conference;

said computer system comparing each expected load to a tentative least load to be experienced by said one or more computer processors;

said computer system determining a least expected load of said plurality of expected loads based on said comparing each expected load to said tentative least load;

said computer system determining a time interval of said plurality of equal time intervals, during which said one or more computer processors are to experience said least expected load based on said expected utilization of said one or more computer processors by said plurality of web conferences other than said web conference, wherein said least expected load is less than or equal to any other load of said plurality of expected loads;

said computer system determining a tentative start date included in said date range and a tentative start time included in said time range so that a time period that starts at said tentative start date and said tentative start time, and that extends for said initialized duration, is included in said time interval during which said one or more computer processors are to experience said least expected load based on said expected utilization of said one or more computer processors by said plurality of web conferences other than said web conference; and said computer system scheduling said web conference based on said tentative start date, said tentative start time, and said initialized duration.

2. The method of claim 1, further comprising:

said computer system tentatively scheduling said web conference based on said tentative start date, said tentative start time, and said initialized duration;

subsequent to said tentatively scheduling, said computer system receiving an updated duration from a web browser via a user interface provided by said web browser, wherein said updated duration is greater than said initialized duration;

said computer system determining an updated time period that starts at said tentative start date and said tentative start time, and that extends for said updated duration, is not included in said time interval during which said one or more computer processors are to experience said least expected load;

said computer system determining a plurality of updated equal time intervals based on said updated duration;

said computer system determining a plurality of updated expected loads to be experienced by said one or more computer processors during said plurality of updated equal time intervals, said plurality of updated expected loads based on said expected utilization of said one or more computer processors by said plurality of web conferences;

said computer system determining a least updated expected load of said plurality of updated expected loads and an updated time interval of said plurality of equal time intervals during which said one or more computer processors are to experience said least updated expected load based on said expected utilization of said one or more computer processors by said plurality of web conferences;

said computer system determining an updated start date included in said date range and an updated start time included in said time range so that a second time period that starts at said updated start date and said updated start time, and that extends for said updated duration, is included in said updated time interval during which said one or more computer processors are to experience said least updated expected load; and said computer system re-scheduling said web conference based on said updated start date, said updated start time, and said updated duration.

3. The method of claim 1, wherein said determining said plurality of expected loads includes determining a plurality of numbers of participants, each number of participants scheduled to participate in a corresponding one or more web conferences of said plurality of web conferences in a corresponding time interval of said plurality of equal time intervals, wherein said comparing each expected load to said tentative least load includes comparing each number of participants to a tentative minimum number of participants, wherein said comparing each number of participants to said tentative minimum number of participants includes determining a number of participants of said plurality of numbers of participants is less than said tentative minimum number of participants, and responsive to said determining said number of participants is less than said tentative minimum number of participants, updating said tentative minimum number of participants to be said determined number of participants, wherein said determining said least expected load includes, based on said updated tentative minimum number of participants, determining a final minimum number of participants scheduled to participate in one or more web conferences of said plurality of web conferences in any time interval of said plurality of equal time intervals, wherein said determining said time interval during which said one or more computer processors are to experience said least expected load includes determining a time interval of said plurality of equal time intervals during which said final minimum number of participants are scheduled to participate in said one or more web conferences, and wherein said determining said tentative start date and said tentative start time is further based on said time interval during which said final minimum number of participants are scheduled to participate in said one or more web conferences.

4. A computer system comprising:

a processor; and a computer-readable storage device coupled to said processor, said storage device containing instructions that when carried out by said processor implement a method of optimally scheduling a web conference managed by a web application, said method comprising:

scheduling a plurality of web conferences other than said web conference;

initializing a duration during which said web conference is to be completed, a number of users to be included in said web conference, a date range with a plurality of predefined dates and a time range with a plurality of predefined times, wherein said web conference is to be scheduled within said date range and within said time range, wherein said plurality of web conferences are scheduled within said initialized date range and said initialized time range, and wherein said web conference and said plurality of web conferences other than said web conference are to utilize one or more computer processors managed by said web application;

determining a plurality of equal time intervals within said initialized date range and said initialized time range;

determining a plurality of expected loads to be experienced by said one or more computer processors during said plurality of equal time intervals, said plurality of expected loads based on expected utilization of said one or more computer processors by said plurality of web conferences other than said web conference;

comparing each expected load to a tentative least load to be experienced by said one or more computer processors;

determining a least expected load of said plurality of expected loads based on said comparing each expected load to said tentative least load;

determining a time interval of said plurality of equal time intervals, during which said one or more computer processors are to experience said least expected load based on said expected utilization of said one or more computer processors by said plurality of web conferences other than said web conference, wherein said least expected load is less than or equal to any other load of said plurality of expected loads;

determining a tentative start date included in said date range and a tentative start time included in said time range so that a time period that starts at said tentative start date and said tentative start time, and that extends for said initialized duration, is included in said time interval during which said one or more computer processors are to experience said least expected load based on said expected utilization of said one or more computer processors by said plurality of web conferences other than said web conference; and scheduling said web conference based on said tentative start date, said tentative start time, and said initialized duration.

5. The system of claim 4, wherein said method further comprises:

tentatively scheduling said web conference based on said tentative start date, said tentative start time, and said initialized duration;

subsequent to said tentatively scheduling, receiving an updated duration from a web browser via a user interface provided by said web browser, wherein said updated duration is greater than said initialized duration;

determining an updated time period that starts at said tentative start date and said tentative start time, and that extends for said updated duration, is not included in said time interval during which said one or more computer processors are to experience said least expected load;

determining a plurality of updated equal time intervals based on said updated duration;

determining a plurality of updated expected loads to be experienced by said one or more computer processors during said plurality of updated equal time intervals, said plurality of updated expected loads based on said expected utilization of said one or more computer processors by said plurality of web conferences;

determining a least updated expected load of said plurality of updated expected loads and an updated time interval of said plurality of equal time intervals during which said one or more computer processors are to experience said least updated expected load based on said expected utilization of said one or more computer processors by said plurality of web conferences;

determining an updated start date included in said date range and an updated start time included in said time range so that a second time period that starts at said updated start date and said updated start time, and that extends for said updated duration, is included in said updated time interval during which said one or more computer processors are to experience said least updated expected load; and re-scheduling said web conference based on said updated start date, said updated start time, and said updated duration.

6. The system of claim 4, wherein said determining said plurality of expected loads includes determining a plurality of numbers of participants, each number of participants scheduled to participate in a corresponding one or more web conferences of said plurality of web conferences in a corresponding time interval of said plurality of equal time intervals, wherein said comparing each expected load to said tentative least load includes comparing each number of participants to a tentative minimum number of participants, wherein said comparing each number of participants to said tentative minimum number of participants includes determining a number of participants of said plurality of numbers of participants is less than said tentative minimum number of participants, and responsive to said determining said number of participants is less than said tentative minimum number of participants, updating said tentative minimum number of participants to be said determined number of participants, wherein said determining said least expected load includes, based on said updated tentative minimum number of participants, determining a final minimum number of participants scheduled to participate in one or more web conferences of said plurality of web conferences in any time interval of said plurality of equal time intervals, wherein said determining said time interval during which said one or more computer processors are to experience said least expected load includes determining a time interval of said plurality of equal time intervals during which said final minimum number of participants are scheduled to participate in said one or more web conferences, and wherein said determining said tentative start date and said tentative start time is further based on said time interval during which said final minimum number of participants are scheduled to participate in said one or more web conferences.

7. A program product for optimally scheduling a web conference managed by a web application, said computer program product comprising:

a tangible, computer readable storage device having computer readable program code stored therein, the computer readable program code comprising:

computer readable program code for scheduling a plurality of web conferences other than said web conference;

computer readable program code for initializing a duration during which said web conference is to be completed, a number of users to be included in said web conference, a date range with a plurality of predefined dates and a time range with a plurality of predefined times, wherein said web conference is to be scheduled within said date range and within said time range, wherein said plurality of web conferences are scheduled within said initialized date range and said initialized time range, and wherein said web conference and said plurality of web conferences other than said web conference are to utilize one or more computer processors managed by said web application;

computer readable program code for determining a plurality of equal time intervals within said initialized date range and said initialized time range;

computer readable program code for determining a plurality of expected loads to be experienced by said one or more computer processors during said plurality of equal time intervals, said plurality of expected loads based on expected utilization of said one or more computer processors by said plurality of web conferences other than said web conference;

computer readable program code for comparing each expected load to a tentative least load to be experienced by said one or more computer processors;

computer readable program code for determining a least expected load of said plurality of expected loads based on said comparing each expected load to said tentative least load;

computer readable program code for determining a time interval of said plurality of equal time intervals, during which said one or more computer processors are to experience said least expected load based on said expected utilization of said one or more computer processors by said plurality of web conferences other than said web conference, wherein said least expected load is less than or equal to any other load of said plurality of expected loads;

computer readable program code for determining a tentative start date included in said date range and a tentative start time included in said time range so that a time period that starts at said tentative start date and said tentative start time, and that extends for said initialized duration, is included in said time interval during which said one or more computer processors are to experience said least expected load based on said expected utilization of said one or more computer processors by said plurality of web conferences other than said web conference; and computer readable program code for scheduling said web conference based on said tentative start date, said tentative start time, and said initialized duration.

8. The program product of claim 7, wherein said computer readable program code further comprises:

computer readable program code for tentatively scheduling said web conference based on said tentative start date, said tentative start time, and said initialized duration;

computer readable program code for receiving, subsequent to said tentatively scheduling, an updated duration from a web browser via a user interface provided by said web browser, wherein said updated duration is greater than said initialized duration;

computer readable program code for determining an updated time period that starts at said tentative start date and said tentative start time, and that extends for said updated duration, is not included in said time interval during which said one or more computer processors are to experience said least expected load;

computer readable program code for determining a plurality of updated equal time intervals based on said updated duration;

computer readable program code for determining a plurality of updated expected loads to be experienced by said one or more computer processors during said plurality of updated equal time intervals, said plurality of updated expected loads based on said expected utilization of said one or more computer processors by said plurality of web conferences;

computer readable program code for determining a least updated expected load of said plurality of updated expected loads and an updated time interval of said plurality of equal time intervals during which said one or more computer processors are to experience said least updated expected load based on said expected utilization of said one or more computer processors by said plurality of web conferences;

computer readable program code for determining an updated start date included in said date range and an updated start time included in said time range so that a second time period that starts at said updated start date and said updated start time, and that extends for said updated duration, is included in said updated time interval during which said one or more computer processors are to experience said least updated expected load; and computer readable program code for re-scheduling said web conference based on said updated start date, said updated start time, and said updated duration.

9. The program product of claim 7, wherein said computer readable program code for determining said plurality of expected loads includes computer readable program code for determining a plurality of numbers of participants, each number of participants scheduled to participate in a corresponding one or more web conferences of said plurality of web conferences in a corresponding time interval of said plurality of equal time intervals, wherein said computer readable program code for comparing each expected load to said tentative least load includes computer readable program code for comparing each number of participants to a tentative minimum number of participants, wherein said computer readable program code for comparing each number of participants to said tentative minimum number of participants includes computer readable program code for determining a number of participants of said plurality of numbers of participants is less than said tentative minimum number of participants, and computer readable program code for, responsive to said determining said number of participants is less than said tentative minimum number of participants, updating said tentative minimum number of participants to be said determined number of participants, wherein said computer readable program code for determining said least expected load includes computer readable program code for determining, based on said updated tentative minimum number of participants, a final minimum number of participants scheduled to participate in one or more web conferences of said plurality of web conferences in any time interval of said plurality of equal time intervals, wherein said computer readable program code for determining said time interval during which said one or more computer processors are to experience said least expected load includes computer readable program code for determining a time interval of said plurality of equal time intervals during which said final minimum number of participants are scheduled to participate in said one or more web conferences, and wherein said computer readable program code for determining said tentative start date and said tentative start time is further based on said time interval during which said final minimum number of participants are scheduled to participate in said one or more web conferences.

10. A process for deploying computing infrastructure, said method comprising integrating computer-readable code into a computer system, wherein the code in combination with the computer system is capable of performing a method of optimally scheduling a web conference managed by a web application, said method comprising:

scheduling a plurality of web conferences other than said web conference;

initializing a duration during which said web conference is to be completed, a number of users to be included in said web conference, a date range with a plurality of predefined dates and a time range with a plurality of predefined times, wherein said web conference is to be scheduled within said date range and within said time range, wherein said plurality of web conferences are scheduled within said initialized date range and said initialized time range, and wherein said web conference and said plurality of web conferences other than said web conference are to utilize one or more computer processors managed by said web application;

determining a plurality of equal time intervals within said initialized date range and said initialized time range;

determining a plurality of expected loads to be experienced by said one or more computer processors during said plurality of equal time intervals, said plurality of expected loads based on expected utilization of said one or more computer processors by said plurality of web conferences other than said web conference;

comparing each expected load to a tentative least load to be experienced by said one or more computer processors;

determining a least expected load of said plurality of expected loads based on said comparing each expected load to said tentative least load;

determining a time interval of said plurality of equal time intervals, during which said one or more computer processors are to experience said least expected load based on said expected utilization of said one or more computer processors by said plurality of web conferences other than said web conference, wherein said least expected load is less than or equal to any other load of said plurality of expected loads;

determining a tentative start date included in said date range and a tentative start time included in said time range so that a time period that starts at said tentative start date and said tentative start time, and that extends for said initialized duration, is included in said time interval during which said one or more computer processors are to experience said least expected load based on said expected utilization of said one or more computer processors by said plurality of web conferences other than said web conference; and scheduling said web conference based on said tentative start date, said tentative start time, and said initialized duration.

11. The process of claim 10, wherein said method further comprises:

tentatively scheduling said web conference based on said tentative start date, said tentative start time, and said initialized duration;

subsequent to said tentatively scheduling, receiving an updated duration from a web browser via a user interface provided by said web browser, wherein said updated duration is greater than said initialized duration;

determining an updated time period that starts at said tentative start date and said tentative start time, and that extends for said updated duration, is not included in said time interval during which said one or more computer processors are to experience said least expected load;

determining a plurality of updated equal time intervals based on said updated duration;

determining a plurality of updated expected loads to be experienced by said one or more computer processors during said plurality of updated equal time intervals, said plurality of updated expected loads based on said expected utilization of said one or more computer processors by said plurality of web conferences;

determining a least updated expected load of said plurality of updated expected loads and an updated time interval of said plurality of equal time intervals during which said one or more computer processors are to experience said least updated expected load based on said expected utilization of said one or more computer processors by said plurality of web conferences;

determining an updated start date included in said date range and an updated start time included in said time range so that a second time period that starts at said updated start date and said updated start time, and that extends for said updated duration, is included in said updated time interval during which said one or more computer processors are to experience said least updated expected load; and re-scheduling said web conference based on said updated start date, said updated start time, and said updated duration.

12. The process of claim 10, wherein said determining said plurality of expected loads includes determining a plurality of numbers of participants, each number of participants scheduled to participate in a corresponding one or more web conferences of said plurality of web conferences in a corresponding time interval of said plurality of equal time intervals, wherein said comparing each expected load to said tentative least load includes comparing each number of participants to a tentative minimum number of participants, wherein said comparing each number of participants to said tentative minimum number of participants includes determining a number of participants of said plurality of numbers of participants is less than said tentative minimum number of participants, and responsive to said determining said number of participants is less than said tentative minimum number of participants, updating said tentative minimum number of participants to be said determined number of participants, wherein said determining said least expected load includes, based on said updated tentative minimum number of participants, determining a final minimum number of participants scheduled to participate in one or more web conferences of said plurality of web conferences in any time interval of said plurality of equal time intervals, wherein said determining said time interval during which said one or more computer processors are to experience said least expected load includes determining a time interval of said plurality of equal time intervals during which said final minimum number of participants are scheduled to participate in said one or more web conferences, and
wherein said determining said tentative start date and said tentative start time is further based on said time interval during which said final minimum number of participants are scheduled to participate in said one or more web conferences.

* * * * *